US012712420B2

(12) United States Patent
Lim

(10) Patent No.: US 12,712,420 B2
(45) Date of Patent: Aug. 18, 2026

(54) VIBRATION MOTOR HAVING THROUGH HOLE FORMED IN ROTOR

(71) Applicant: Young Kyoun Lim, Incheon (KR)

(72) Inventor: Young Kyoun Lim, Incheon (KR)

( * ) Notice: Subject to any disclaimer, the term of this patent is extended or adjusted under 35 U.S.C. 154(b) by 217 days.

(21) Appl. No.: 18/707,102

(22) PCT Filed: Oct. 18, 2022

(86) PCT No.: PCT/KR2022/015786
§ 371 (c)(1),
(2) Date: May 2, 2024

(87) PCT Pub. No.: WO2023/085626
PCT Pub. Date: May 19, 2023

(65) Prior Publication Data

US 2025/0030325 A1 Jan. 23, 2025

(30) Foreign Application Priority Data

Nov. 11, 2021 (KR) ........................ 10-2021-0154552

(51) Int. Cl.
*H02K 33/00* (2006.01)
*H02K 1/27* (2022.01)
*H02K 7/08* (2006.01)

(52) U.S. Cl.
CPC ............... *H02K 33/00* (2013.01); *H02K 1/27* (2013.01); *H02K 7/083* (2013.01)

(58) Field of Classification Search
CPC ........... H02K 33/00; H02K 1/27; H02K 7/083
See application file for complete search history.

(56) References Cited

U.S. PATENT DOCUMENTS

2021/0023580 A1* 1/2021 Lim .......................... E03D 9/08

FOREIGN PATENT DOCUMENTS

KR 20-0422546 B1 8/2006

* cited by examiner

*Primary Examiner* — Viet P Nguyen
(74) *Attorney, Agent, or Firm* — Goldilocks ZONE IP LAW

(57) ABSTRACT

The present invention relates to a vibration motor having a through hole formed in a rotor, in which: a rotor that penetrates and is coupled to a motor housing and a vibrating part plays a role of receiving a cleaning solvent and at the same time acts as a vibration transmission medium, and thus, no separate supply pipe is required, thereby contributing to cost reduction and productivity improvement; simplification of an internal structure assists in improving performance; a nozzle is detachably fixed to a front end of the rotor, and thus, various types of nozzles can be selectively replaced according to an object to be cleaned; and an object to be cleaned can be effectively washed by supplying various cleaning solvents such as water, oil, powder, and air to the through hole in the rotor.

8 Claims, 9 Drawing Sheets

[FIG.1]
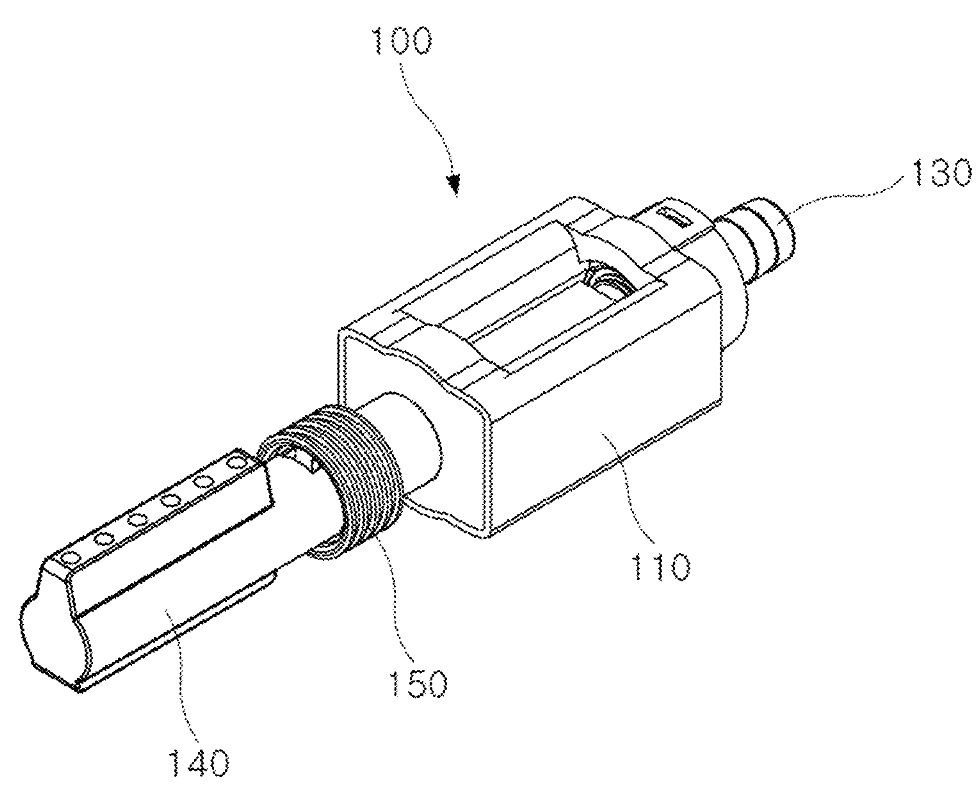

[FIG.2]
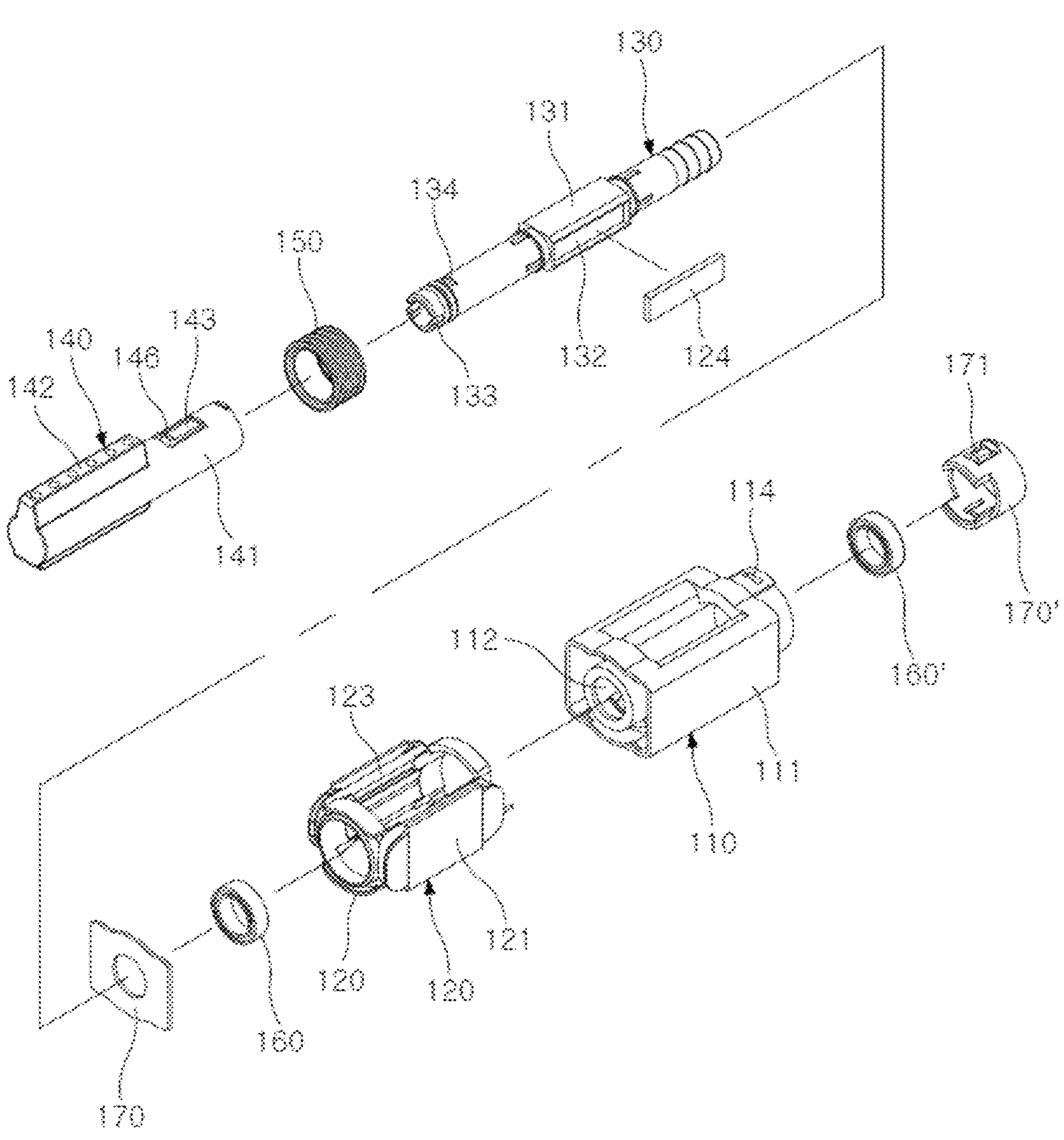

[FIG.3]
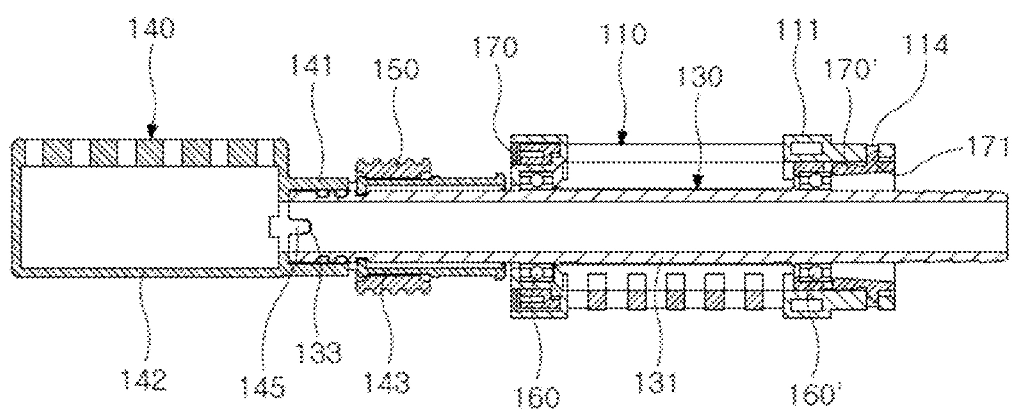

[FIG.4]
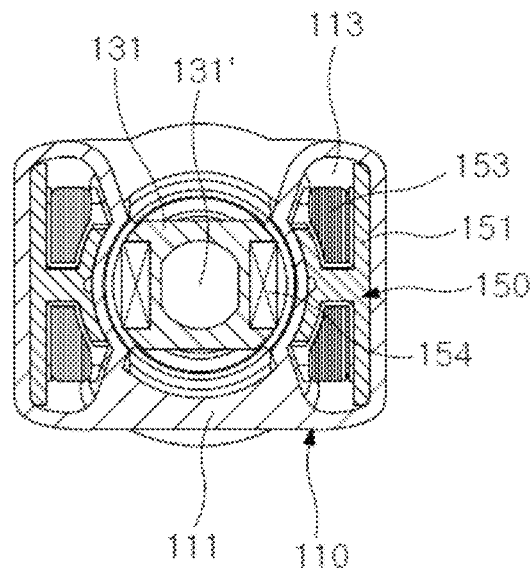

[FIG.5]
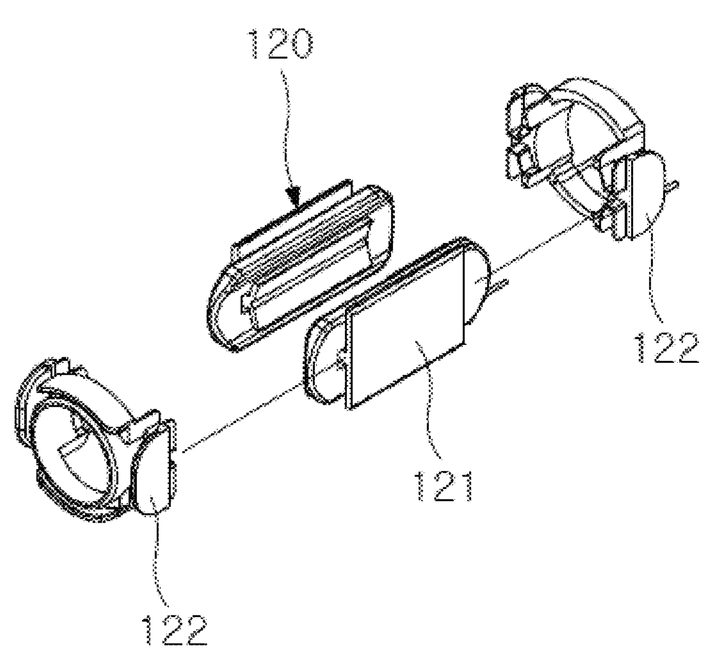

[FIG.6]
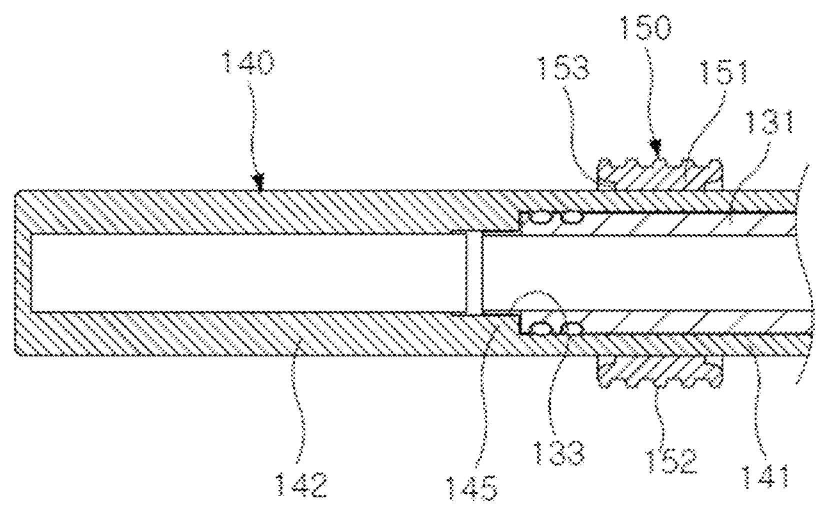

[FIG.7]
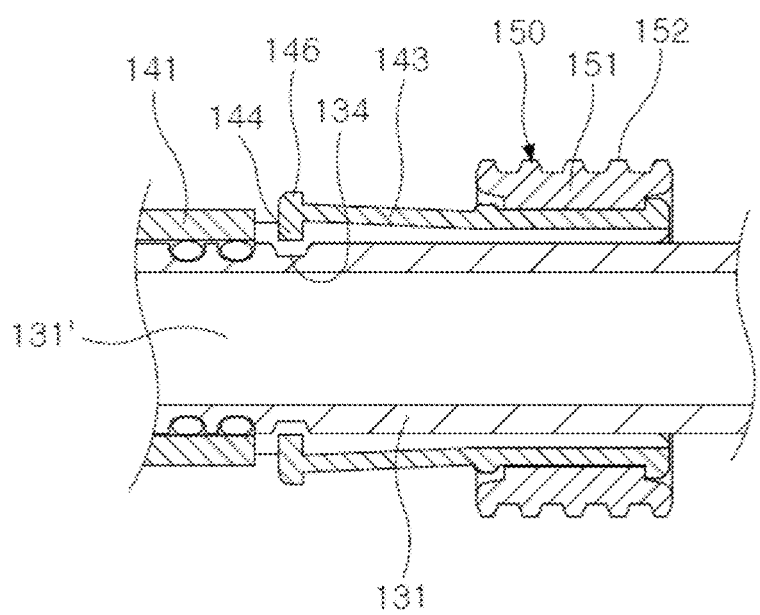

[FIG.8]
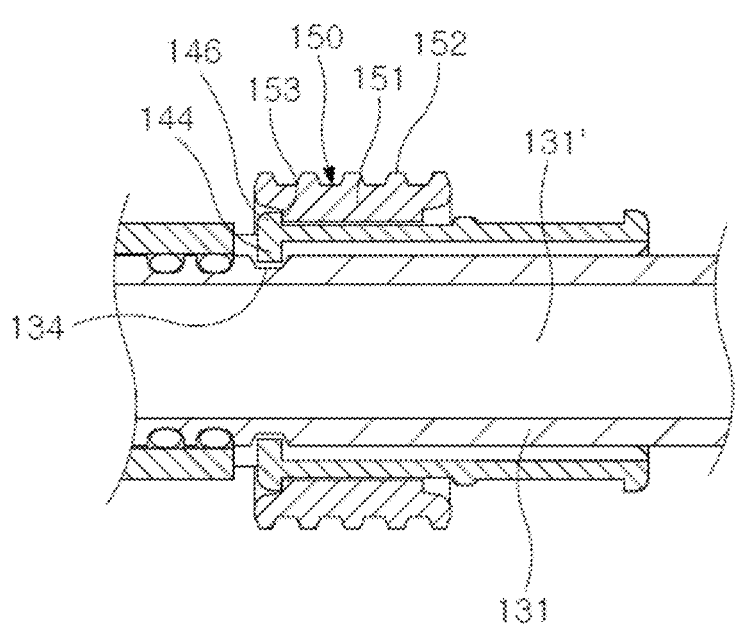

[FIG.9]
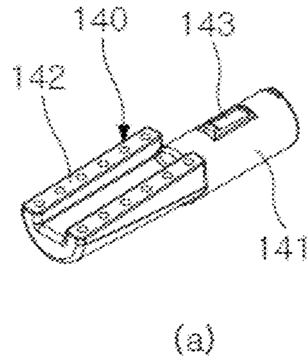
(a)
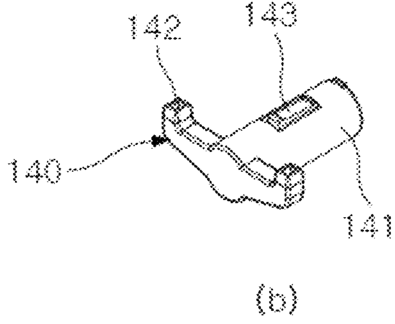
(b)
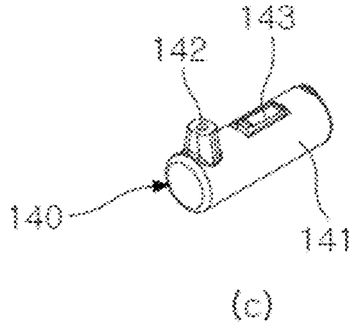
(c)

VIBRATION MOTOR HAVING THROUGH HOLE FORMED IN ROTOR

CROSS-REFERENCE TO RELATED APPLICATIONS

This application claims the benefit under 35 U.S.C. section 371, of PCT International Application No. PCT/KR2022/015786, filed on Oct. 18, 2022, which claims foreign priority to Korean Patent Application No. 10-2021-0154552, filed on Nov. 11, 2021, in the Korean Intellectual Property Office, both of which are hereby incorporated by reference in their entireties.

TECHNICAL FIELD

The present disclosure relates generally to a vibration motor. More particularly, the present disclosure relates to a vibration motor having a through hole formed in a rotor, in which: the rotor that penetrates and is coupled to a motor housing and a vibrating part serves both as a recipient of a cleaning solvent and as a vibration transmission medium, and thus, no separate supply pipe is required, thereby contributing to cost reduction and productivity improvement; simplification of an internal structure can assist in improving performance; a nozzle is detachably fixed to a front end of the rotor, and thus, various types of nozzles can be selectively replaced depending on an object to be cleaned; and the object to be cleaned can be effectively washed by supplying various cleaning solvents such as water, oil, powder, and air to the through hole in the rotor.

BACKGROUND ART

Generally, vibration motors that generate vibration are used in various fields such as various health products, medical devices, and cleaning products.

These vibration motors convert electrical energy into mechanical energy, i.e., torque, by mediating the electromagnetic field in the gap between a stator and a rotor according to the so-called Fleming's left-hand rule, which states that a current-carrying conductor receives force when it is placed in a magnetic field.

As a related art in which the above-mentioned vibration motor is utilized, a vibration device for a bidet nozzle is disclosed in Korean Utility Model Registration No. 20-0422546.

The related-art vibration device has a vibrating part built into a nozzle with a flow path, so that a vibrating member vibrates the nozzle to eject cleaning water while being rotated in response to a bidet button signal, thereby expanding the cleaning area and making it easy to clean. Despite of these advantages, however, the following disadvantages are invited. First, since the vibrating part is integrally mounted inside the nozzle, the vibration amplitude of the nozzle is small, which reduces cleaning power. Also, since the vibrating member that causes vibration in the nozzle is mounted perpendicular to, or vertically from a nozzle pipe, there is a limit to giving an active action to a water jet ejected through a cleaning hole.

In addition, since the vibrating part that generates vibration and a fluid supply pipe through which water flows are formed separately, which makes the configuration complicated. Furthermore, since a single built-in nozzle is used to clean an object to be cleaned without being able to match to the shape or material of the object to be cleaned, there is a problem of not meeting user satisfaction.

DISCLOSURE

Technical Problem

Accordingly, the present disclosure has been made keeping in mind the above problems occurring in the related art, and an objective of the present disclosure is to provide a vibration motor having a through hole formed in a rotor, in which the rotor that penetrates and is coupled to a motor housing and a vibrating part serves both as a recipient of the cleaning solvent and as a vibration transmission medium, and thus, no separate supply pipe is required, thereby contributing to cost reduction and productivity improvement, and simplification of an internal structure can assist in improving performance.

Another objective of the present disclosure is to provide a vibration motor having a through hole formed in a rotor, in which a nozzle is detachably fixed to a front end of the rotor, and thus, various types of nozzles can be selectively replaced depending on an object to be cleaned.

Another objective of the present disclosure is to provide a vibration motor having a through hole formed in a rotor, in which an object to be cleaned can be effectively washed by supplying various cleaning solvents such as water, oil, powder, and air to the through hole in the rotor.

Technical Solution

The present disclosure provides a vibration motor having a through hole formed in a rotor, the vibration motor including: a motor housing; a vibrating part coupled to opposite inner sides of the motor housing and providing vibration while rotating the rotor in forward and reverse directions; the rotor having a predetermined length, having the through hole formed therein, and coupled to an inner central portion of the motor housing; a nozzle detachably coupled to a front side of the rotor; a coupling part fixing the rotor to the nozzle; bearings coupled to the rotor inside the motor housing and guiding rotation of the rotor; and front and rear covers coupled to front and rear sides of the motor housing.

The motor housing may include: a body portion; a mounting hole formed through an inner central portion of the body portion; a coupling space formed at each of opposite sides of an inside of the body portion around the mounting hole to allow the vibrating part 120 to be coupled thereto; and a coupling hole formed at each of upper and lower portions of a rear end of the body portion to allow the rear cover to be coupled thereto.

The vibrating part may include: a stator mounted at each of the opposite sides of the inside of the body portion of the motor housing; an insulator fixing the stator inside the motor housing; a coil wound around the stator; and a magnet mounted on each of opposite side surfaces of the rotor.

The stator and the insulator may be integrally formed by insert injection molding.

The rotor may have the predetermined length, and may include: a shaft having the through hole formed therethrough and having a front end coupled to the nozzle, a central portion located inside the motor housing, and a rear end exposed to an outside of the motor housing; a mounting groove formed at each of opposite sides of the central portion of the shaft to allow the magnet of the vibrating part to be mounted therein; an insertion hole formed at the front end of the shaft to allow the nozzle to be coupled thereto; and a fixing groove formed on an outer peripheral surface of the shaft behind the insertion hole to allow the nozzle to be coupled thereto.

The nozzle may include: a coupling body coupled to the rotor) to accommodate the rotor; a nozzle tip formed at a front end of the coupling body; an elastic piece having elasticity and formed at each of upper and lower portions of the coupling body; a fixing protrusion protruding inward and fixing the coupling body to the rotor; and an insertion protrusion formed at an inner boundary between the coupling body and the nozzle tip and coupled to a front end of the rotor, and the nozzle may further include: a stopper protruding at an front end of the elastic piece.

The coupling part may include: a coupling ring coupled to a coupling body of the nozzle and pressing an elastic piece against the rotor; a plurality of protrusions formed on an outer peripheral surface of the coupling ring to be easily operable by a user; and a catching step formed on an inner surface of a front end of the coupling ring and caught by a stopper of the nozzle.

One bearing may be mounted inside the motor housing and rotates the rotor, and the remaining bearing may be mounted inside the rear cover and rotates the rotor.

The front cover may be fixed to a front end of the motor housing by ultrasonic fusion or insert molding, and the rear cover may include a fixing piece formed at each of upper and lower portions thereof to be coupled to the coupling hole formed at a rear end of the motor housing.

Advantageous Effects

According to the present disclosure, since a rotor that penetrates and is coupled to a motor housing and a vibrating part serves both as a recipient of the cleaning solvent and as a vibration transmission medium, no separate supply pipe is required, thereby contributing to cost reduction and productivity improvement, and simplification of an internal structure can assist in improving performance.

In addition, according to the present disclosure, since a nozzle is detachably fixed to a front end of the rotor, various types of nozzles can be selectively replaced depending on an object to be cleaned, thereby improving user convenience.

In addition, according to the present disclosure, the object to be cleaned can be effectively washed by supplying various cleaning solvents such as water, oil, powder, and air to the through hole in the rotor.

DESCRIPTION OF DRAWINGS

FIG. 1 is a perspective view illustrating a vibration motor according to an embodiment of the present disclosure.

FIG. 2 is an exploded perspective view illustrating the vibration motor according to the embodiment of the present disclosure.

FIG. 3 is a side sectional view illustrating the vibration motor according to the embodiment of the present disclosure.

FIG. 4 is a front sectional view illustrating the vibration motor according to the embodiment of the present disclosure.

FIG. 5 is an exploded perspective view illustrating a vibrating part according to the present disclosure.

FIGS. 6 to 8 are sectional views illustrating a coupled state of a rotor and a nozzle according to the present disclosure.

FIG. 9 is a perspective view illustrating another embodiment of the nozzle according to the present disclosure.

MODE FOR INVENTION

Hereinbelow, various embodiments of the present disclosure will be described in detail with reference to the accompanying drawings. The embodiments described herein may be modified in various ways. Specific embodiments are described in the drawings and may be described in detail in the detailed description. It should be understood, however, that the specific embodiments disclosed in the accompanying drawings are only intended to facilitate an understanding of the various embodiments of the present disclosure. Therefore, it is to be understood that the technical idea of the present disclosure is not limited by the specific embodiments disclosed in the accompanying drawings, but the present disclosure should be understood to include all equivalents or alternatives included in the spirit and technical scope of the present disclosure.

Terms including ordinals, such as first, second, etc., may be used to describe various elements, but such elements are not limited to the above terms. The above terms are only used to distinguish one element from another element.

The terms “comprise”, “have”, etc., when used in this specification, specify the presence of stated features, integers, steps, operations, elements, components, and/or combinations thereof but do not preclude the presence or addition of one or more other features, integers, steps, operations, elements, components, and/or combinations thereof. It is to be understood that when an element is referred to as being “coupled” or “connected” to another element, it can be directly coupled or connected to the other element or intervening elements may be present therebetween. In contrast, when an element is referred to as being “directly coupled” or “directly connected” to another element, there are no intervening elements present.

A “module” or a “part” for elements used in the present specification performs at least one function or operation. Also, the “module” or the “part” may perform functions or operations by hardware, software, or a combination of hardware and software. Also, a plurality of “modules” or a plurality of “parts”, other than a “module” or a “part” that is to be performed in specific hardware or performed in at least one processor, may be integrated into at least one module. The singular forms are intended to include the plural forms as well, unless the context clearly indicates otherwise.

Further, in the following description of the present disclosure, the detailed description of known functions and configurations incorporated herein will be omitted when it may make the subject matter of the present disclosure rather unclear.

FIG. 1 is a perspective view illustrating a vibration motor according to an embodiment of the present disclosure. FIG. 2 is an exploded perspective view illustrating the vibration motor according to the embodiment of the present disclosure.

The vibration motor 100 having a through hole formed in a rotor according to the present disclosure includes: a motor housing 110; a vibrating part 120 coupled to opposite inner sides of the motor housing 110 and providing vibration while rotating the rotor 130 in forward and reverse directions; the rotor 130 having a predetermined length, having the through hole formed therein, and coupled to an inner central portion of the motor housing 110; a nozzle 140 detachably coupled to a front side of the rotor 130; a coupling part 150 fixing the rotor 130 to the nozzle 140;

bearings 160 and 160' coupled to the rotor 130 inside the motor housing 110 and guiding the rotation of the rotor 130; front and rear covers 170 and 170' coupled to front and rear sides of the motor housing 110.

The motor housing 110 is coupled with the rotor 130 inserted therein, and has a mounting hole 112 formed through an inner central portion of a body portion 111.

A coupling space 113 is formed at each of opposite sides of an inside of the body portion 111 around the mounting hole 112 to allow the vibrating part 120 to be coupled thereto.

The body portion 111 has a front end to which the front cover 170 is coupled and fixed, and a rear end having a coupling hole 114 formed at each of upper and lower portions thereof to allow the rear cover 170' to be coupled thereto.

In addition, the vibrating part 120 includes a stator 121 mounted in the coupling space 113 formed at each of the opposite sides of the inside of the body portion 111, and an insulator 122 coupled to each of front and rear ends of the stator 121 and fixed inside the motor housing 110.

Here, as illustrated in FIG. 5, it is preferable that the stator 121 and the insulator 122 are integrally formed by insert injection molding, and a coil 123 is wound around the stator 121.

A magnet 124 is fixed to each of opposite side surfaces of the rotor 130. The rotor 130 is rotated in forward and reverse directions and generates vibration by the operation of the vibrating part 120 configured as above.

In addition, as illustrated in FIG. 6, the rotor 130 supplies a cleaning solvent to the nozzle 140 while being vibrated by the vibrating part 120.

The rotor 130 has a predetermined length, and includes a shaft 131 provided therein and having the through hole 131' formed therethrough.

The shaft 131 has a front end coupled to a coupling body 141 of the nozzle 140, a central portion located inside the motor housing 110, and a rear end exposed to the outside of the motor housing 110.

The central portion of the shaft 131 has a quadrangular cross-section, and the front and rear ends thereof have a circular cross-section with the central portion of the quadrangular cross-section interposed therebetween.

A mounting groove 132 is formed at each of opposite sides of the central portion of the shaft 131 to allow the magnet 124 of the vibrating part 120 to be mounted therein.

An insertion hole 133 open forward is formed at each of opposite sides of the front end of the shaft 131 to allow an insertion protrusion 145 formed on the nozzle 140 to be inserted and coupled thereto.

A fixing groove 134 is formed at each of upper and lower portions of an outer peripheral surface of the shaft 131 behind the insertion hole 133 and is fixed to the coupling body 141 of the nozzle 140 by the manipulation of the coupling part 150.

By the provision of the insertion hole 133 and the fixing groove 134 formed at the front end of the shaft 131, the rotor 130 can be detachably fixed to the nozzle 140.

As described above, the rotor 130 simultaneously serves as a recipient of the cleaning solvent and as a vibration transmission medium, so there is no need for a separate supply pipe.

In addition, the nozzle 140 includes the coupling body 141 to which the front end of the rotor 130 is coupled. The coupling body 141 has a front end provided with a nozzle tip 142 that allows the cleaning solvent supplied from the rotor 130 to be ejected therethrough.

An elastic piece 143 having elasticity is formed at each of upper and lower portions of the coupling body 141. The elastic piece 143 has a front end provided with a fixing protrusion 144 protruding inward to fix the rotor 130.

The insertion protrusion 145 is formed at an inner boundary between the coupling body 141 and the nozzle tip 142, and is inserted and coupled into the insertion hole 133 formed at the front end of the rotor 130.

A stopper 146 protruding outward is provided at the front end of the elastic piece 143 to prevent the coupling part 150 from deviating from the elastic piece 143 when the coupling part 150 is manipulated.

As illustrated in FIG. 9, cleaning solvents such as oil, powder, and air as well as water are supplied to the through hole 131' of the rotor 130 and sprayed through the nozzle 140. The nozzle 140 is used differently depending on the shape or material of an object to be cleaned, the amount of cleaning solvent, the cleaning intensity, and the cleaning area. Therefore, various types of nozzles can be selectively mounted on the front end of the rotor 130 and used appropriately.

In addition, as illustrated in FIGS. 7 and 8, the coupling part 150 includes a coupling ring 151 coupled to an outer peripheral surface of the coupling body 141 of the nozzle 140.

The coupling ring 151 is located on the motor housing 110 when the nozzle 140 is separated from the rotor 130. In order to fix the nozzle 140 to the rotor 130 while the nozzle 140 is coupled to the rotor 130, first, when the coupling ring 151 is moved toward the nozzle tip 142, an inner peripheral surface of the coupling ring 151 presses the elastic piece 143, and the fixing protrusion 144 formed on the elastic piece 143 is brought into close contact with the fixing groove 134 of the rotor 130, thereby fixing the rotor 130 and the nozzle 140.

A plurality of protrusions 152 are formed in an annular shape on an outer peripheral surface of the coupling ring 151 to prevent slipping when held by a user.

A catching step 153 is formed at a front end of the coupling ring 151 so that when the nozzle 140 is moved to be coupled to the rotor 130, the coupling ring 151 is caught by the stopper 146 of the nozzle 140 and is not moved further.

In addition, the bearings 160 and 160' are mounted to rotate the rotor 130. One bearing 160 has an outer diameter mounted inside the motor housing 110 and an inner diameter in close contact with the outer periphery of the rotor 130, and the remaining bearing 160' has an outer diameter mounted inside the rear cover 170' and an inner diameter in close contact with the outer periphery of the rotor 130 to guide the rotation of the rotor 130.

In addition, the front cover 170 closes the open front side the motor housing 110, and is fixed by ultrasonic fusion or insert molding.

The rear cover 170' closes the open rear side of the motor housing 110, and includes a fixing piece 171 formed at each of upper and lower portions thereof. The fixing piece 171 is coupled to the coupling hole 114 formed in the motor housing 110 to fix the rear cover 170'.

As described above, according to the vibration motor having the through hole formed in the rotor according to the present disclosure, the rotor 130 serves both as a recipient of the cleaning solvent and as a vibration transmission medium, and thus, no separate supply pipe is required, thereby contributing to cost reduction and productivity improvement, and simplification of an internal structure can assist in improving performance.

In addition, the nozzle is detachably fixed to the front end of the rotor, and thus, various types of nozzles can be selectively replaced depending on the object to be cleaned, thereby improving user convenience.

Although the present disclosure has been described with reference to limited examples and drawings, the present disclosure is not limited thereto. All terms or words used herein should not be interpreted as being limited merely to common and dictionary meanings but should be interpreted as having meanings and concepts which are defined within the technical scope of the present disclosure.

Therefore, the present disclosure is intended to cover not only the exemplary embodiments, but also various alternatives, modifications, equivalents, and other embodiments that may be included within the spirit and scope of the present disclosure as defined by the appended claims.

The invention claimed is:

1. A vibration motor having a through hole formed in a rotor, the vibration motor comprising:

a motor housing;

a vibrating part coupled to opposite inner sides of the motor housing and providing vibration while rotating the rotor in forward and reverse directions;

the rotor having a predetermined length, having the through hole formed therein, and coupled to an inner central portion of the motor housing;

a nozzle detachably coupled to a front side of the rotor;

a coupling part fixing the rotor to the nozzle;

bearings coupled to the rotor inside the motor housing and guiding rotation of the rotor; and front and rear covers coupled to front and rear sides of the motor housing, wherein the motor housing comprises:

a body portion;

a mounting hole formed through an inner central portion of the body portion;

a coupling space formed at each of opposite sides of an inside of the body portion around the mounting hole to allow the vibrating part to be coupled thereto; and a coupling hole formed at each of upper and lower portions of a rear end of the body portion to allow the rear cover to be coupled thereto.

2. The vibration motor of claim 1, wherein the vibrating part comprises:

a stator mounted at each of the opposite sides of the inside of the body portion of the motor housing;

an insulator fixing the stator inside the motor housing;

a coil wound around the stator; and a magnet mounted on each of opposite side surfaces of the rotor.

3. The vibration motor of claim 2, wherein the stator and the insulator are integrally formed by insert injection molding.

4. The vibration motor of claim 1, wherein the rotor has the predetermined length, and comprises:

a shaft having the through hole formed therethrough and having a front end coupled to the nozzle, a central portion located inside the motor housing, and a rear end exposed to an outside of the motor housing;

a mounting groove formed at each of opposite sides of the central portion of the shaft to allow the magnet of the vibrating part to be mounted therein;

an insertion hole formed at the front end of the shaft to allow the nozzle to be coupled thereto; and a fixing groove formed on an outer peripheral surface of the shaft behind the insertion hole to allow the nozzle to be coupled thereto.

5. The vibration motor of claim 1, wherein the nozzle comprises:

a coupling body coupled to the rotor to accommodate the rotor;

a nozzle tip formed at a front end of the coupling body;

an elastic piece having elasticity and formed at each of upper and lower portions of the coupling body;

a fixing protrusion protruding inward and fixing the coupling body to the rotor; and an insertion protrusion formed at an inner boundary between the coupling body and the nozzle tip and coupled to a front end of the rotor, and the nozzle further comprises: a stopper protruding at an front end of the elastic piece.

6. The vibration motor of claim 1, wherein the coupling part comprises:

a coupling ring coupled to a coupling body of the nozzle and pressing an elastic piece against the rotor;

a plurality of protrusions formed on an outer peripheral surface of the coupling ring to be easily operable by a user; and a catching step formed on an inner surface of a front end of the coupling ring and caught by a stopper of the nozzle.

7. The vibration motor of claim 1, wherein one bearing is mounted inside the motor housing and rotates the rotor, and the remaining bearing is mounted inside the rear cover and rotates the rotor.

8. The vibration motor of claim 1, wherein the front cover is fixed to a front end of the motor housing by ultrasonic fusion or insert molding, and the rear cover comprises a fixing piece formed at each of upper and lower portions thereof to be coupled to the coupling hole formed at a rear end of the motor housing.

* * * * *